March 9, 1965   R. E. SAND ETAL   3,172,996
ELECTRIC HEATING SYSTEMS
Filed Nov. 23, 1962   2 Sheets-Sheet 1

INVENTORS
ROBERT E. SAND
HARRIS P. KAMIDE
BY Prangley, Baird, Clayton, Miller & Vogel,
ATTYS.

March 9, 1965 R. E. SAND ETAL 3,172,996
ELECTRIC HEATING SYSTEMS
Filed Nov. 23, 1962 2 Sheets-Sheet 2
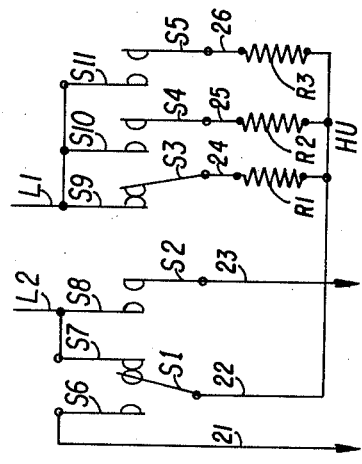
FIG. 5 MEDIUM 1300 WATTS
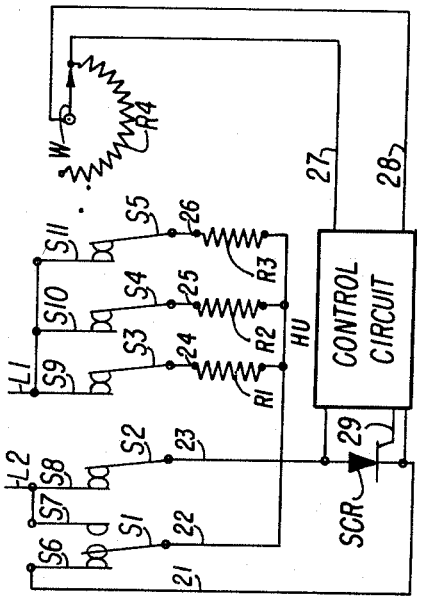
FIG. 6 LOW 1000 TO 0 WATTS
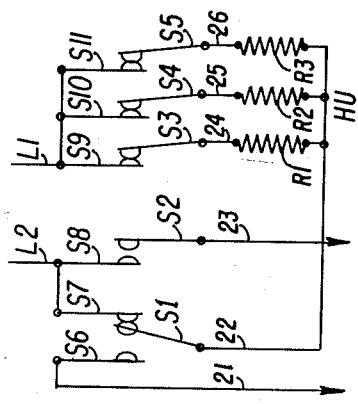
FIG. 3 HIGH 4200 WATTS
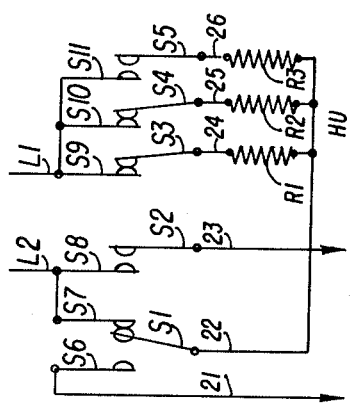
FIG. 4 MED. HIGH 2700 WATTS
INVENTORS
ROBERT E. SAND
HARRIS P. KAMIDE
BY
ATTYS.

United States Patent Office 3,172,996
Patented Mar. 9, 1965

3,172,996
ELECTRIC HEATING SYSTEMS
Robert E. Sand, Itasca, and Harris P. Kamide, Franklin Park, Ill., assignors to General Electric Company, a corporation of New York
Filed Nov. 23, 1962, Ser. No. 239,661
9 Claims. (Cl. 219—489)

The present invention relates to electric heating systems, and more particularly to such systems incorporating hotplates and adapted for use in cooking appliances.

It is a general object of the invention to provide an electric heating system that is especially adapted for carrying out cooking operations and that includes a heating unit and an improved combination switching arrangement and electronic control arrangement for selectively governing the electric power that is supplied to the heating unit and consequently the heat that is developed thereby.

Another object of the invention is to provide an electric heating system of the type noted, wherein the high power requirements of the heating unit are supplied by the switching arrangement mentioned and the low power requirements of the heating unit are supplied by the electronic control arrangement mentioned.

Another object of the invention is to provide an electric heating system of the character described, wherein the switching arrangement essentially comprises a unitary manually operable control switch having a plurality of "high," "medium high," etc., positions directly completing corresponding heating connections to the heating unit independently of the electronic control arrangement and a "low" position completing a heating connection to the unit via the electronic control arrangement.

Another object of the invention is to provide an electric heating system of the character described, wherein the "low" position of the unitary manually operable control switch is variable and further including facility responsive to variable operation of the unitary manually operable control switch within its variable "low" position for selectively presetting the control of the electronic control arrangement so that a wide variety of low power requirements of the heating unit may be established within the variable "low" position of the unitary manually operable control switch.

Another object of the invention is to provide an electric heating system of the character described, wherein the electronic control arrangement is of the "infinite" control type, and the range of variation of the unitary manually operable control switch within its variable "low" position matches the range of the electronic control arrangement, so that an infinite number of low power requirements of the heating unit may be established over the corresponding range of variable operation of the unitary manually operable control switch within its variable "low" position.

A further object of the invention is to provide an electric heating system of the character described, wherein the electronic control arrangement essentially comprises a solid state controlled rectifier and a control circuit therefor.

Further features of the invention pertain to the particular arrangement of the elements of the electric heating system and of the associated control circuit network therefor, whereby the above-outlined and additional operating features thereof are attained.

The invention, both as to its organization and method of operation, together with further objects and advantages thereof, will best be understood by reference to the following specification, taken in connection with the accompanying drawings, in which:

FIG. 3 is a diagrammatic illustration of the circuits completed when the unitary manually operable control switch occupies its "high" position;

FIG. 4 is a diagrammatic illustration of the circuits completed when the control switch mentioned occupies its "medium high" position;

FIG. 5 is a diagrammatic illustration of the circuits completed when the control switch mentioned occupies its "medium" position; and FIG. 6 is a diagrammatic illustration of the circuits completed when the control switch mentioned occupies its "low" position.

Figure 1:
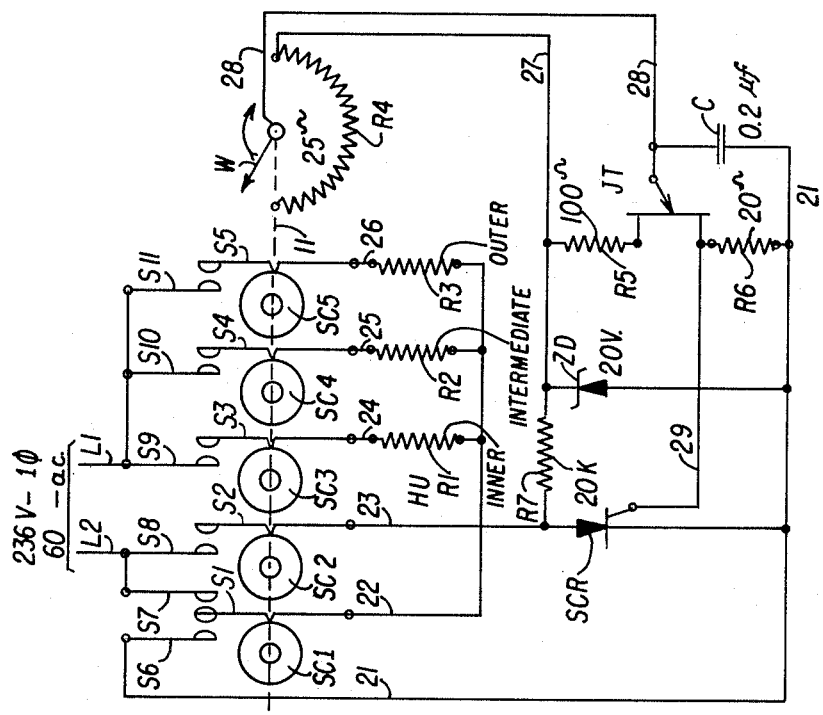
FIGURE 1 is a diagrammatic illustration of an electric heating system, embodying the present invention, and including a unitary manually operable control switch, and an electric heating unit provided with three individual heating elements.
Figure 2:
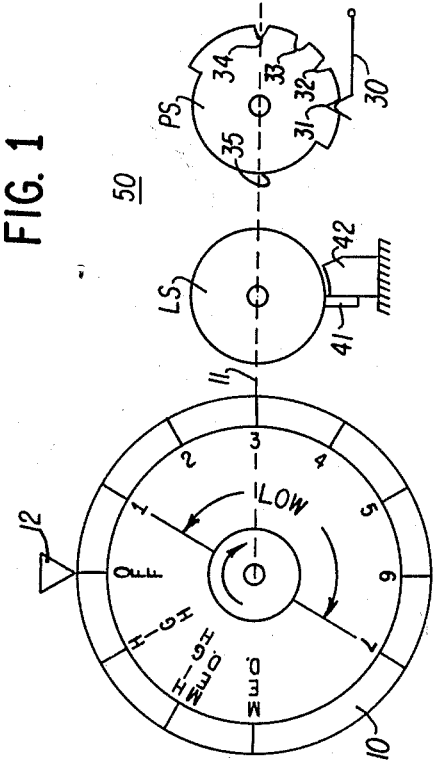
FIG. 2 is a diagrammatic illustration of the three individual heating elements arranged to form a unified hotplate that is especially adapted for use in carrying out cooking operations in a cooking appliance.
Figure 2:
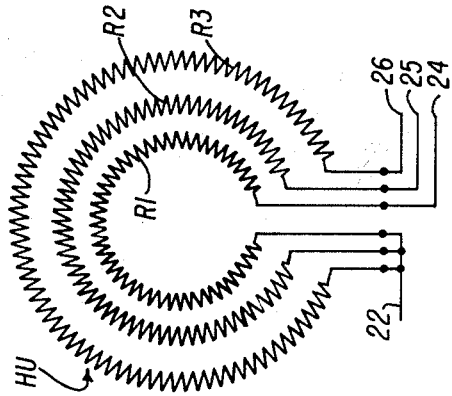

Referring now to FIG. 1 of the drawings, there is diagrammatically illustrated an electric heating system embodying the features of the present invention, and essentially comprising an electric heating unit HU, including three individual heating elements R1, R2 and R3, a manually operable control device in the form of a rotary dial 10, a unitary control switch 50 selectively operated by the dial 10, a source of electric power supply of 236 volts, single phase, 60 cycles, A.-C., including a pair of line conductors L1 and L2, and a circuit network. As best illustrated in FIG. 2, the heating unit HU is in the form of a hotplate that is especially suited to carrying out cooking operations in a cooking appliance, such as an electric range; whereby the three individual heating elements R1, R2 and R3 are respectively arranged in inner, intermediate and outer positions in the hotplate. The hotplate HU is normally constructed of disk-like form and is adapted directly to support the cooking vessel containing the food to be cooked. Preferably, the individual heating elements R1, R2 and R3 are of the usual sheathed resistance conductor type, so as to eliminate shock-hazard, all in a conventional manner.

Reverting to FIG. 1, the rotary dial 10 is mounted upon the extremity of a rotary shaft 11 incorporated in the unitary control switch 50 that may be of any well-known type, such, for example, as that illustrated. The dial 10 cooperates with an externally mounted index marker 12 and comprises an annular skirt carrying indicia indicative of the corresponding positions of the dial 10. Specifically, the dial 10 comprises the fixed positions "off," "high," "medium high" and "medium" and the variable position "low," and the skirt of the dial 10 carries the corresponding indicia cooperating with the index marker 12. In the arrangement, the "low" position subtends an angle of 180°, and the same is calibrated from "7" down to "1," representing progressively lower heat settings in the "low" position of the dial 10, as explained more fully below. The positions mentioned of the dial 10 are established by a position cam PS rigidly secured to the rotatably mounted shaft 11 and a cooperating spring 30. Specifically, the position cam PS is substantially disklike, having four V-shaped notches 31, 32, 33 and 34 formed in adjacent positions in the periphery thereof and having a long notch 35 formed in the periphery thereof; which notches mentioned cooperate with the spring 30. Specifically, when the dial 10 is rotated into its "off" position, as indicated by the cooperating index marker 12, the spring 30 falls into the notch 31 in the position cam PS, so as to preserve this fixed "off" position of the dial 10, in an obvious manner. The "high," "medium-high" and "medium" positions of the dial 10 also comprises fixed positions that are preserved by the spring 30 respectively cooperating with the notches 32, 33 and 34 in the position cam PS. On the other hand, the "low" position of the dial 10 comprises a variable position thereof, so that the spring 30 cooperates with the long notch 35 in the position cam PS in order to accommodate infinite rotary adjustment of the dial 10 in its variable "low" position in an obvious manner.

Also, the rotatably mounted shaft 11 has rigidly secured thereto a limit stop LS carrying a stop pin 41 that cooperates with an exteriorly mounted stop abutment 42; whereby the dial 10 may be rotated from its "off" position illustrated only in the clockwise direction and only through a total angle of 330°, as permitted by the cooperation between the stop pin 41 and the stop abutment 42, as clearly illustrated.

The unitary control switch 50 further comprises five insulating control cams SC1, SC2, SC3, SC4 and SC5 rigidly secured to the rotary shaft 11, and arranged selectively to control the positions of five respectively associated resilient movable switch springs S1, S2, S3, S4 and S5. The movable switch spring S1 is a double-throw spring and selectively governs two stationary switch springs S6 and S7; and the switch springs S2, S3, S4 and S5 are single-throw springs and respectively govern four stationary switch springs S8, S9, S10 and S11.

The extreme inner end of the rotary shaft 11 carries a wiper W that selectively cooperates with an associated potentiometer resistor R4. More particularly, the wiper W normally disengages the resistor R4, but engages the same when the dial 10 occupies its variable "low" position. In the arrangement, as the dial 10 is rotated in its "low" position successively to present the figures "7," "6," etc., to the index marker 12, successively larger amounts of the resistor R4 are included by the wiper W between two conductors 27 and 28 respectively terminated by one end of the resistor R4 and by the wiper W, for a purpose more fully explained below.

Further, the electric heating system comprises a solid state controlled rectifier SCR, preferably of the silicon crystal type, a zener diode ZD, a unijunction transistor JT, a capacitor C, and three additional resistors R5, R6 and R7.

In the circuit network, the switch springs S1, S2, S3, S4 and S5 respectively terminate five conductors 22, 23, 24, 25 and 26; the switch spring S6 terminates a conductor 21; the two switch springs S7 and S8 terminate the line conductor L2; and the switch springs S9, S10 and S11 terminate the line conductor L1. The heating element R1 is bridged across the conductors 22 and 24; the heating element R2 is bridged across the conductors 22 and 25; and the heating element R3 is bridged across the conductors 22 and 26. The power terminals of the solid state controlled rectifier SCR are respectively connected to the conductors 23 and 21; and the control terminal of the solid state controlled rectifier SCR is connected to a conductor 29. The power terminals of the unijunction transistor JT are respectively connected by the resistors R5 and R6 to the conductors 27 and 21; and the emitter of the unijunction transistor JT is connected to the conductor 28. Also the conductor 29 is connected to one of the power terminals of the unijunction transistor JT, at the connection to which one terminal of the resistor R6 is made. The capacitor C is bridged across the conductors 21 and 28; and the zener diode ZD is bridged across the conductors 21 and 27. Finally, the resistor R7 is connected between the conductors 23 and 27.

Considering now the mode of operation of the circuit network, when the dial 10 occupies its "off" position, the cams SC1, SC2, SC3, SC4 and SC5 carried by the shaft 11 operate the switch springs S1, S2, S3, S4 and S5 to disengage the switch springs S6, S7, S8, S9, S10 and S11, and the shaft 11 operates the wiper W to disengage the resistor R4, all as shown in FIG. 1; whereby all of the circuits are interrupted, so that the heating elements R1, R2 and R3 are deenergized.

When the dial 10 is rotated into its "high" position, the elements of the circuit network are operated into the positions, as shown in FIG. 3; whereby the three heating elements R1, R2 and R3 are energized in parallel relation across the line conductors L1 and L2, with the result that the heating unit HU develops high heat at 4200 watts.

When the dial 10 is rotated into its "medium high" position, the elements of the circuit network are operated into the positions, as shown in FIG. 4; whereby only the two heating elements R1 and R2 are energized in parallel relation across the line conductors L1 and L2, with the result that the heating unit HU develops medium high heat at 2700 watts.

When the dial 10 is rotated into its "medium" position, the elements of the circuit network are operated into the positions, as shown in FIG. 5; whereby only the single heating element R1 is energized across the line conductors L1 and L2, with the result that the heating unit HU develops medium heat at 1300 watts.

When the dial 10 is rotated into its "low" position, the elements of the circuit network are operated into the positions, as shown in FIG. 6; whereby the heating elements R1, R2 and R3 are connected in parallel relation with each other and in series relation with the solid state controlled rectifier SCR across the line conductors L1 and L2, with the result that the heating unit HU develops low heat within the range 1000 to 0 watts and depending upon the particular adjusted position of the dial 10 within its variable "low" position, as explained more fully hereinafter. More particularly, the line conductor L1 is connected by the engaged switch springs S9, S3 and S10, S4 and S11, S5 to the respective conductors 24, 25 and 26; and the conductors 24, 25 and 26 are respectively connected via the heating elements R1, R2 and R3 to the conductor 22; the conductor 22 is connected via the engaged switch springs S1, S6 to the conductor 21; the conductor 21 is connected via the solid state controlled rectifier SCR to the conductor 23; and the conductor 23 is connected via the engaged switch springs S2, S8 to the line conductor L2.

The solid state controlled rectifier SCR comprises four rectifying junctions in series, p-n-p-n, with the conductor 23 connected to the power terminal at the end p-junction with the conductor 21 connected to the power terminal at the end n-junction, and with the conductor 29 connected to the control terminal at the intermediate p-junction. The rectifier SCR is characterized by a high impedance to the flow of current in either direction between the power terminals thereof, when no signal is applied to the control terminal thereof. The rectifier SCR is also characterized by a low impedance in the direction from the power terminal terminating the conductor 23 to the power terminal terminating the conductor 21, when a positive potential or signal of predetermined value is applied to the control terminal thereof to initiate the conduction of the rectifier SCR, as explained more fully below. Thus, the rectifier SCR blocks conduction through the elements R1, R2 and R3 in the half cycles of the power source, when the line conductor L2 is running negative relative to the line conductor L1, and accommodates conduction through the heating elements R1, R2 and R3 in the half cycles of the power source, when the line conductor L2 is running positive relative to the line conductor L1. However, such conductions mentioned are not initiated merely because the line conductor L2 is running positive, but must be initiated by the reception of a signal or positive pulse via the control terminal thereof; whereby any desired time phase may be interposed with respect to the two conditions mentioned, so that the reception of early signals cause large rectified current pulses to be supplied to the heating elements R1, R2 and R3, and so that the reception of late signals cause small rectified current pulses to be supplied to the heating elements R1, R2 and R3. Of course, the large rectified current pulses cause the heating elements R1, R2 and R3 to develop large wattage (up to 1000 watts), while the small rectified current pulses cause the heating elements R1, R2 and R3 to develop small wattage (down to 0 watt), with all wattages therebetween, depending upon the time-phase relation of the signals received by the control terminal of the rectifier SCR with respect to that of the positive polarity of the line conductor L2 in the corresponding half cycles of the power source.

Considering now the operation of the circuit network in greater detail, when the line conductor L2 begins to run positive in a corresponding positive half cycle of the power source, this voltage is applied via the resistor R7 as a reverse potential across the zener diode ZD and between the conductors 27 and 21, due to the poling of the zener diode ZD, whereby the zener diode conducts a current from the conductor 27 to the conductor 21, thereby establishing the conductor 27 at a voltage of about 20 volts positive with respect to the conductor 21. Also, the zener diode ZD has an impedance characteristic such that it maintains substantially flat the voltage difference of about 20 volts between the conductors 27 and 21, as the voltage on the line conductor L2 continues to rise more positive with respect to the line conductor L1; whereby the zener diode ZD is said to have a "clipping" characteristic with respect to the peak positive voltage that ultimately develops upon the line conductor L2 in this positive half cycle of the supply source. This reference voltage of 20 volts that is thus applied by the zener diode ZD between the conductors 27 and 21 is a D.-C. voltage by virtue of the rectifying characteristic of the zener diode ZD. This reference voltage is also applied across the resistor R5, the transistor JT and the resistor R6; whereby an exceedingly small positive voltage is applied to the conductor 29, but without effect as a control signal upon the control electrode of the rectifier SCR, at this time. Also this reference voltage is applied from the conductor 27 via the resistor R4 and the wiper W to the conductor 28; whereby the capacitor C is charged between the conductors 28 and 21. In fact, the resistor R4 and the capacitor C are connected in series between the conductors 27 and 21, so that the charging rate of the capacitor C is inversely proportional to the amount of the resistor R4 that is included by the wiper W between the conductors 28 and 27; which is dependent upon the adjusted position of the dial 10 in its variable "low" position.

First assuming that the dial 10 occupies a medium numbered position (such as "4") in its "low" position, then a medium amount of the resistor R4 is included by the wiper W between the conductors 28 and 27, so that a medium charging rate is established for the capacitor C; whereby after the elapse of a medium time interval a charge is accumulated by the capacitor such that the voltage thereacross reaches a response voltage, such, for example, as 10 volts. The presence of the response voltage of 10 volts positive upon the conductor 28 with respect to the conductor 21 and applied to the emitter of the transistor JT renders the transistor JT highly conductive so that the capacitor C is abruptly discharged through the transistor JT and the resistor R6 driving the conductor 29 to the control signal value of about 10 volts positive with respect to the conductor 21, as a consequence of the voltage drop across the resistor R6 as the capacitor C is discharged; which control signal applied to the conductor 29 comprises a positive "pip" impressed upon the control terminal of the rectifier SCR with respect to the power terminal thereof connected to the conductor 21; whereby the rectifier SCR is rendered conductive during the remainder of the present positive half cycle of the power source; with the result that a corresponding positive pulse of current is conducted from the line conductor L2 via the three heating elements R1, R2 and R3 in parallel relation and via the rectifier SCR in series relation therewith to the line conductor L1. This positive pulse represents only a medium amount of power; whereby the average power thus supplied to the heating elements R1, R2 and R3 in the positive half cycles of the power source may have a value of 500 watts, for example, since the dial 10 is set at the medium number "4" in the range of the "low" position thereof.

Now assuming that the dial 10 occupies the highest number "7" position in the "low" position thereof, the wiper W engages the contact at the beginning of the resistor R4, thereby connecting the conductor 28 directly to the conductor 27. The capacitor C thus has an exceedingly high charging rate so that the response voltage is reached very early in the positive half cycle of the power source, causing early conduction of the transistor JT and the consequent early conduction of the rectifier SCR, with the result that the positive pulse of current supplied to heating elements R1, R2 and R3, represents a maximum amount of power; whereby the average power thus supplied to the heating elements R1, R2 and R3 in the positive half cycles of the power source may have a value of 1000 watts, since the dial 10 is set the highest number "7" in the range of the "low" position thereof.

Now assuming that the dial 10 occupies the lowest number "1" position on the "low" position thereof, the wiper W engages the contact at the end of the resistor R4, thereby including the entirety of the resistor R4 in the connection between the conductors 28 and 27. The capacitor C thus has an exceedingly low charging rate so that the response voltage is not quite reached in the total time interval of the positive half cycle of the power source, with the result that the transistor JT is not rendered conductive, and neither is the rectifier SCR, during the time interval mentioned. Accordingly, the rectifier SCR remains non-conductive supplying 0 watt or no power to the heating elements R1, R2 and R3.

In view of the above it will be understood that the range of adjustment of the dial 10 between the numbers "7" and "1" corresponds to the full range of response of the circuit network; whereby any value of power between 1000 watts and 0 watt may be supplied to the heating elements R1, R2 and R3 in the "low" position of the dial 10 by adjusting the rotary position of the dial 10 between the numbers "7" and "1" in the "low" position thereof. Accordingly, the dial 10 has an infinite number of adjusted positions between the numbers "7" and "1" in the "low" position thereof, thereby correspondingly to set the circuit network into an infinite number of power supply positions between 1000 watts and 0 watt. Of course, the variable power supply positions of the circuit network, as explained above, represent generally corresponding temperature settings for a given cooking vessel supported by the hotplate HU in an obvious manner; whereby a calibration curve could be prepared for a particular cooking vessel and its contents relating the variable adjustments of the dial 10 in its "low" position to temperatures of the contents mentioned.

Recapitulating the operation of the rectifier SCR: this device is operative cyclically, and in each cycle of operation thereof a ratio is established between the conductive condition and the non-conductive condition thereof by the response time interval of the capacitor C; which response time interval mentioned is preset by the control position of the control apparatus W–R4 that is preset by the adjusted position of the dial 10 within its "low" position. Hence, the variable position of the dial 10 within its "low" position correspondingly presets the ratio between the conductive condition and the non-conductive condition of the rectifier SCR in each cycle of the power source, so as correspondingly to preset the amount of power that is supplied to the heating elements R1, R2 and R3 and consequently the corresponding temperature of the hotplate HU. Of course, the rectifier SCR operates at the frequency (60 cycles per second in the present example) of the power source.

In view of the foregoing, it is apparent that there has been provided in an electric heating system, a single unitary manually operable controller that is selectively operative into a plurality of fixed positions and that is variably operative in a particular position, wherein the controller selectively governs switching mechanism in its fixed positions mentioned to preset the supply of corresponding fixed amounts of power to an associated heating unit, and wherein the controller in its particular position mentioned selectively governs electronic mechanism to preset the supply of corresponding variable amounts of power in a given range or band to the associated heating unit. In the arrangement, it is especially advantageous that the controller in its particular position mentioned governs the electronic mechanism to preset the supply of a band of low power to the heating unit, since it is the corresponding band of low temperatures from about 150° F. to 250° F. that it is highly desirable accurately to preset, in the carrying out of cooking operations in a sauce pan, or the like, supported by the heating unit, or hotplate.

While there has been described what is at present considered to be the preferred embodiment of the invention, it will be understood that various modifications may be made therein, and it is intended to cover in the appended claims all such modifications that fall within the true spirit and scope of the invention.

What is claimed is:

1. In an electric heating system including a heating unit, and a source of A.-C. electric power; the combination comprising a solid state controlled rectifier having a pair of power terminals and a control terminal and characterized by conduction between the power terminals thereof in response to the application of a control signal to the control terminal thereof, a manually operable controller having an "off" position and a "high" position and a variable "low" position, switching mechanism and a control circuit both selectively governed by said controller, said switching mechanism being governed by operation of said controller into its "off" position to disconnect said heating unit from said power source, said switching mechanism being governed by operation of said controller into its "high" position to connect said heating unit directly to said power source independently of said solid state controlled rectifier in order to supply fixed high power to said heating unit, said switching mechanism being governed by operation of said controller into its "low" position to connect said heating unit and the power terminals of said solid state controlled rectifier in series relation to said power source in order to supply controlled low power to said heating unit, said control circuit being connected to said solid state controlled rectifier and operative only during predetermined half cycles of said power source to produce control signals having predetermined time phase relationship to the corresponding predetermined half cycles of said power source, and means for impressing said control signals upon the control terminal of said solid state controlled rectifier so as to govern the conductions between the power terminals thereof for the corresponding time intervals during the corresponding predetermined half cycles of said power source, said control circuit being selectively governed by variable operation of said controller within its variable "low" position selectively to vary the predetermined time phase relationship of said control signals to the corresponding predetermined half cycles of said power source, whereby the corresponding time intervals of conduction between the power terminals of said solid state controlled rectifier during the corresponding predetermined half cycles of said power source are selectively varied in accordance with the variable operation of said controller within its variable "low" position, thereby correspondingly to control the low power supplied to said heating unit via said series connection.

2. The electric heating system set forth in claim 1, wherein the range of variation of said control circuit is matched to the range of variation of said controller within its variable "low" position, whereby the corresponding time intervals of conduction between the power terminals of said solid state controlled rectifier during the corresponding predetermined half cycles of said power source may be selectively varied substantially from 100% to 0% of the time intervals of the corresponding predetermined half cycles of said power source.

3. In an electric heating system including a heating unit, and a source of A.-C. electric power; the combination comprising a solid state controlled rectifier having a pair of power terminals and a control terminal and characterized by conduction between the power terminals thereof in response to the application of a control signal to the control terminal thereof, a single manually operable rotary controller having a fixed "off" position and a fixed "high" position and a variable "low" position, wherein said variable "low" position subtends an angle of rotation of said controller of at least about 120°, switching mechanism and a control circuit both selectively governed by said controller, said switching mechanism being governed by operation of said controller into its "off" position to disconnect said heating unit from said power source, said switching mechanism being governed by operation of said controller into its "high" position to connect said heating unit directly to said power source independently of said solid state controlled rectifier in order to supply fixed high power to said heating unit, said switching mechanism being governed by operation of said controller into its "low" position to connect said heating unit and the power terminals of said solid state controlled rectifier in series relation to said power source in order to supply controlled low power to said heating unit, said control circuit being connected to said solid state controlled rectifier and operative only during predetermined half cycles of said power source to produce control signals having predetermined time phase relationship to the corresponding predetermined half cycles of said power source, and means for impressing said control signals upon the control terminal of said solid state controlled rectifier so as to govern the conductions between the power terminals thereof for the corresponding time intervals during the corresponding predetermined half cycles of said power source, said control circuit being selectively governed by variable operation of said controller within its variable "low" position selectively to vary the predetermined time phase relationship of said control signals to the corresponding predetermined half cycles of said power source, whereby the corresponding time intervals of conduction between the power terminals of said solid state controlled rectifier during the corresponding predetermined half cycles of said power source are selectively varied in accordance with the variable operation of said controller within its variable "low" position, thereby correspondingly to control the low power supplied to said heating unit via said series connection.

4. In an electric heating system including a heating unit, and a source of A.-C. electric power provided with a pair of line conductors; the combination comprising a solid state controlled rectifier having a pair of power terminals and a control terminal and characterized by conduction between the power terminals thereof in response to the application of a control signal to the control terminal thereof, a manually operable controller having an "off" position and a "high" position and a variable "low" position, switching mechanism and a control circuit both selectively governed by said controller, said switching mechanism being governed by operation of said controller into its "off" position to disconnect said heating unit from the line conductors of said power source, said switching mechanism being governed by operation of said controller into its "high" position to connect said heating unit directly across the line conductors of said power source independently of said solid state controlled rectifier in order to supply fixed high power to said heating unit, said switching mechanism being governed by operation of said controller into its "low" position to connect said heating unit and the power terminals of said solid state controlled rectifier in series relation across the line conductors of said power source in order to supply controlled low power to said heating unit, said control circuit being connected to said solid state controlled rectifier and operative only during predetermined half cycles of said power source to produce control signals having predetermined time phase relationship to the corresponding predetermined half cycles of said power source, and means for impressing said control signals upon the control terminal of said solid state controlled rectifier so as to govern the conductions between the power terminals thereof for the corresponding time intervals during the corresponding predetermined half cycles of said power source, said control circuit being selectively governed by variable operation of said controller within its variable "low" position selectively to vary the predetermined time phase relationship of said control signals to the corresponding predetermined half cycles of said power source, whereby the corresponding time intervals of conduction between the power terminals of said solid state controlled rectifier during the corresponding predetermined half cycles of said power source are selectively varied in accordance with the variable operation of said controller within its variable "low" position, thereby correspondingly to control the low power supplied to said heating unit via said series connection.

5. In an electric heating system including three heating elements, and a source of A.-C. electric power provided with a pair of line conductors; the combination comprising a solid state controlled rectifier having a pair of power terminals and a control terminal and characterized by conduction between the power terminals thereof in response to the application of a control signal to the control terminal thereof, a manually operable controller having an "off" position and a "high" position and a "medium high" position and a "medium" position and a "low" position, switching mechanism and a control circuit both selectively governed by said controller, said switching mechanism being governed by operation of said controller into its "off" position to disconnect all three of said heating elements from the line conductors of said power source, said switching mechanism being governed by operation of said controller into its "high" position to connect all three of said heating elements in parallel relation directly across the line conductors of said power source, said switching mechanism being governed by operation of said controller into its "medium high" position to connect only two of said three heating elements in parallel relation directly across the line econductors of said power source, said switching mechanism being governed by operation of said controller into its "medium" position to connect only one of said three heating elements directly across the line conductors of said power source, said switching mechanism being governed by operation of said controller into its "low" position to connect all three of said heating elements in parallel relation with each other as a heating unit and to connect said heating unit and the power terminals of said solid state controlled rectifier in series relation across the line conductors of said power source, said control circuit being connected to said solid state controlled rectifier and operative only during predetermined half cycles of said power source to produce control signals having predetermined time phase relationship to the corresponding predetermined half cycles of said power source, and means for impressing said control signals upon the control terminal of said solid state controlled rectifier so as to govern the conductions between the power terminals thereof for the corresponding time intervals during the corresponding predetermined half cycles of said power source, said control circuit being selectively governed by variable operation of said controller within its variable "low" position selectively to vary the predetermined time phase relationship of said control signals to the corresponding predetermined half cycles of said power source, whereby the corresponding time intervals of conduction between the power terminals of said solid state controlled rectifier during the corresponding predetermined half cycles of said power source are selectively varied in accordance with the variable operation of said controller within its variable "low" position.

6. The electric heating system combination set forth in claim 5, wherein said three heating elements are arranged in a hotplate so that first and second and third of said heating elements are respectively disposed in inner and intermediate and outer positions in said hotplate, said inner and intermediate heating elements constitute the two heating elements that are energized in the "medium high" position of said controller, and said inner heating element constitutes the one heating element that is energized in the "medium" position of said controller.

7. In an electric heating system including a heating unit, and a soure of electric power; a cyclically operable device operative in each cycle thereof alternately between conductive and non-conductive conditions, a manually operable controller having an "off" position and a "high" position and a variable "low" position, switching mechanism selectively governed by said controller, said switching mechanism being governed by operation of said controller into its "off" position to disconnect said heating unit from said power source, said switching mechanism being governed by operation of said controller into its "high" position to connect said heating unit to said power source independently of said device in order to supply fixed high power to said heating unit, said switching mechanism being governed by operation of said controller into its "low" position to connect said heating unit and said device in series relation to said power source in order to supply controlled low power to said heating unit, and a control circuit selectively governed by said controller and operatively connected to said device, said control circuit being selectively governed by variable operation of said controller within its "low" position both to initiate cyclic operation of said device and correspondingly to vary the ratio between the conductive condition and the non-conductive condition of said device in each cycle of operation thereof, whereby the low power thus supplied to said heating unit in said series connection is selectively controlled in accordance with said ratio.

8. In an electric heating system including a heating unit, and a source of electric power; a cyclically operable device operative in each cycle thereof alternately between conductive and non-conductive conditions, a manually operable controller having an "off" position and a "high" position and a variable "low" position, switching mechanism selectively governed by said controller, said switching mechanism being governed by operation of said controller into its "off" position to disconnect said heating unit from said power source, said switching mechanism being governed by operation of said controller into its "high" position to connect said heating unit to said power source independently of said device in order to supply fixed high power to said heating unit, said switching mechanism being governed by operation of said controller into its "low" position to connect said heating unit and said device in series relation to said power source, control apparatus operatively connected to said controller, said control apparatus being variably positioned within a predetermined control range by variable operation of said controller within its "low" position, and a control circuit operatively connected both to said control apparatus and to said device, said control circuit being selectively governed by variable positioning of said control apparatus within its control range both to initiate cyclic operation of said device and correspondingly to vary the ratio between the conductive condition and the non-conductive condition of said device in each cycle of operation thereof, whereby the low power thus supplied to said heating unit in said series connection is selectively controlled in accordance with said ratio.

9. In an electric heating system including a heating unit, and a source of electric power; a cyclically operable device operative in each cycle thereof alternately between conductive and non-conductive conditions, a manually operable controller having a variable "control" position, switching mechanism governed by said controller and having an "off" position and a "high" position and a "low" position, said switching mechanism in its "off" position disconnecting said heating unit from said power source, said switching mechanism in its "high" position connecting said heating unit to said power source independently of said device in order to supply fixed high power to said heating unit, said switching mechanism in its "low" position connecting said heating unit and said device in series relation to said power source in order to supply controlled low power to said heating unit, and a control circuit operatively connected to said device and controlled by said switching mechanism in its "low" position to initiate cyclic operation of said device, said control circuit being selectively governed by variable operation of said controller within its "control" position correspondingly to vary the ratio between the conductive condition and the non-conductive condition of said device in each cycle of operation thereof, whereby the low power thus supplied to said heating unit in said series connection is selectively controlled in accordance with said ratio.

References Cited in the file of this patent
UNITED STATES PATENTS
3,051,813  Busch et al. _____ Aug. 28, 1962